United States Patent [19]

Snyder et al.

[11] Patent Number: 5,706,643
[45] Date of Patent: Jan. 13, 1998

[54] ACTIVE GAS TURBINE COMBUSTION CONTROL TO MINIMIZE NITROUS OXIDE EMISSIONS

[75] Inventors: Timothy S. Snyder, Glastonbury; Thomas J. Rosfjord, South Windsor, both of Conn.

[73] Assignee: United Technologies Corporation, Hartford, Conn.

[21] Appl. No.: 557,267

[22] Filed: Nov. 14, 1995

[51] Int. Cl.⁶ .................................. F02C 9/28

[52] U.S. Cl. ........................ 60/39.06; 60/39.281

[58] Field of Search .................. 60/39.06, 39.091, 60/39.281, 725

[56] References Cited

U.S. PATENT DOCUMENTS

| | | | |
|---|---|---|---|
| 5,428,951 | 7/1995 | Wilson et al. | 60/725 |
| 5,544,478 | 8/1996 | Shu et al. | 60/725 |
| 5,575,144 | 11/1996 | Brough | 60/725 |

*Primary Examiner*—Louis J. Casaregola
*Attorney, Agent, or Firm*—Marina F. Cunningham

[57] ABSTRACT

A method of minimizing nitrous oxide emissions in a gas turbine engine includes a step of monitoring pressure fluctuations within a gas turbine engine combustor and a step of adjusting fuel flow to the combustor if the pressure fluctuations therein exceed a preestablished threshold. The combustor can be operated at the lowest levels of nitrous oxide emissions since the onset of a combustor instability and/or blowout is identified early to allow for corrective action so that such undesirable events are prevented.

11 Claims, 6 Drawing Sheets

ACTIVE GAS TURBINE COMBUSTION CONTROL TO MINIMIZE NITROUS OXIDE EMISSIONS

TECHNICAL FIELD

The present invention relates to gas turbine engines and, more particularly, to minimization of nitrous oxide emissions without causing combustor instability or a blowout therein.

BACKGROUND ART

As a byproduct of combustion, gas turbine engines typically emit nitrous oxides ($NO_x$) that are harmful to the atmosphere. Formation of nitrous oxides during the combustion process generally results from a reaction between fuel and air at high temperatures. The level of nitrous oxide emissions can be reduced by controlling the flame temperature during the combustion process. A known approach to controlling the combustion temperature, and therefore to minimizing the nitrous oxide emissions, is to uniformly premix fuel and air prior to combustion to eliminate regions of fuel-rich mixtures which produce locally high combustion temperatures. Once the fuel is uniformly premixed, it is desirable to operate gas turbine engines within a narrow fuel-lean region below a certain combustion temperature to achieve an acceptably low level of nitrous oxide emissions. However, the combustor must operate above a lean blowout temperature to prevent combustion instability and/or a lean blowout.

The lowest levels of nitrous oxide emissions are attained when gas turbine engines operate as closely as possible to a lean blowout line. However, when the gas turbine engine already operates under fuel-lean conditions and the engine power is reduced, thereby resulting in reduction of fuel flow and in lower flame temperature, the gas turbine engine combustor enters the region of instability and subsequently crosses the line of lean blowout. When the gas turbine engine operates within the instability region, the times can move upstream and damage the nozzle. If the engine crosses the lean blowout line, the combustion process ceases. Thus, it is desirable to operate gas turbine engines as close as possible to the lean blowout line without crossing the lean blowout line and without operating within the instability zone for a prolonged period of time.

Presently, the industry is struggling to achieve the lowest possible nitrous oxide emissions without sacrificing safety, durability, and performance of gas turbine engines.

SUMMARY OF THE DISCLOSURE

It is an object of the present invention to minimize nitrous oxide emissions in gas turbine engines.

It is another object of the present invention to operate a gas turbine engine in the most fuel-lean environment possible without causing combustor instability or lean blowout.

According to the present invention, a method of minimizing nitrous oxide emissions by operating the combustor as close to a lean blowout as possible includes a step of monitoring pressure fluctuations within the combustor and a step of adjusting fuel flow entering the combustor to stabilize the combustor. The onset of the combustor instability and lean blowout can be detected prior to its occurrence through monitoring of pressure fluctuations within the combustor and subsequent analysis of the pressure fluctuations by a signal analyzing means. Once the onset of the blowout is detected, a signal is sent to a fuel schedule controller to adjust fuel flow entering the combustor. The adjustment of fuel may include either an increase in the amount of pilot fuel or control of stages of main fuel or pilot fuel to locally increase the combustion temperature within the combustor. An increased amount of pilot fuel flows into the combustor to increase flame temperature therein and to stabilize combustion. The stages of either main fuel or pilot fuel can be also controlled by reducing the amount of fuel flow to some nozzles and increasing fuel flow to other nozzles. Such staging would result in enriched fuel-lean pockets around the nozzles with increased amount of fuel flow, thereby sustaining the combustion process and minimizing the risk of a lean blowout. Once the analyzing means determines that the combustor is stabilized, the fuel flow is adjusted again to return the combustor to fuel-lean combustion. Thus, the present invention allows operation of the combustor very close to the lean blowout line resulting in the lowest levels of nitrous oxide emissions without causing combustor instabilities or lean blowout.

A primary advantage of the present invention is that after corrective action is taken to avert combustor instabilities and/or lean blowout, the combustor returns to fuel-lean operation resulting in low levels of nitrous oxide emissions. Thus, the combustor operates at the enriched fuel-lean level only long enough to stabilize the combustor.

The foregoing and other objects and advantages of the present invention become more apparent in light of the following detailed description of the exemplary embodiment thereof, as illustrated in the accompanying drawings.

BEST MODE FOR CARRYING OUT THE INVENTION

Figure 1:
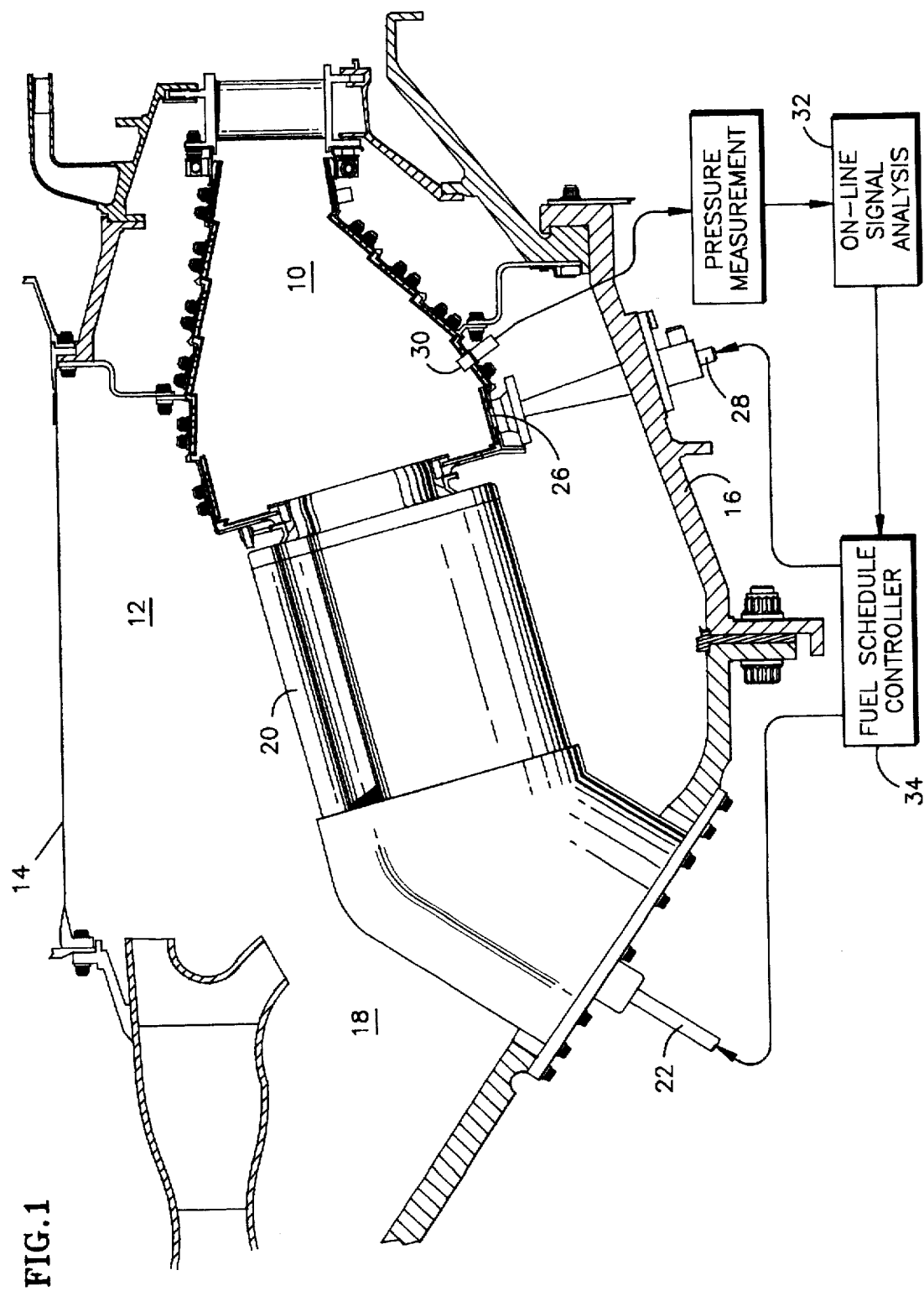
FIG. 1 is a schematic representation of a cross section of a gas turbine engine combustor and includes a schematic diagram of an active fuel control system to minimize nitrous oxide emissions.

Referring to FIG. 1, an annular combustor 10 is disposed within an annulus 12 between an inner engine case 14 and an outer engine case 16. A diffuser 18 leads axially into the annulus 12 from a compression section (not shown). Each combustor discharges to a turbine section (not shown). A plurality of main fuel nozzles 20 are spaced circumferentially within the annulus 12 to premix the main fuel with a portion of the air exiting the diffuser and to supply the fuel and air mixture to the combustor 10. A plurality of main fuel supply means 22 supply fuel to the main nozzles 20. A plurality of pilot fuel nozzles 26 supply pilot fuel to the combustor 10 with a plurality of pilot fuel supply means 28 distributing fuel to the pilot fuel nozzles 26. A plurality of igniter means (not shown) is disposed within the vicinity of the pilot fuel nozzles 26 to ignite fuel supplied to the pilot fuel nozzles 26.

A high response pressure probe 30 is disposed within the combustor 10 to monitor pressure fluctuations therein. The pressure probe 30 sends the pressure signal for an on-line signal analysis to a signal analyzing means 32. The signal analyzing means 32 communicates with the fuel schedule controller 34 that adjusts pilot fuel and main fuel flowrates to the combustor 10.

Figure 2:
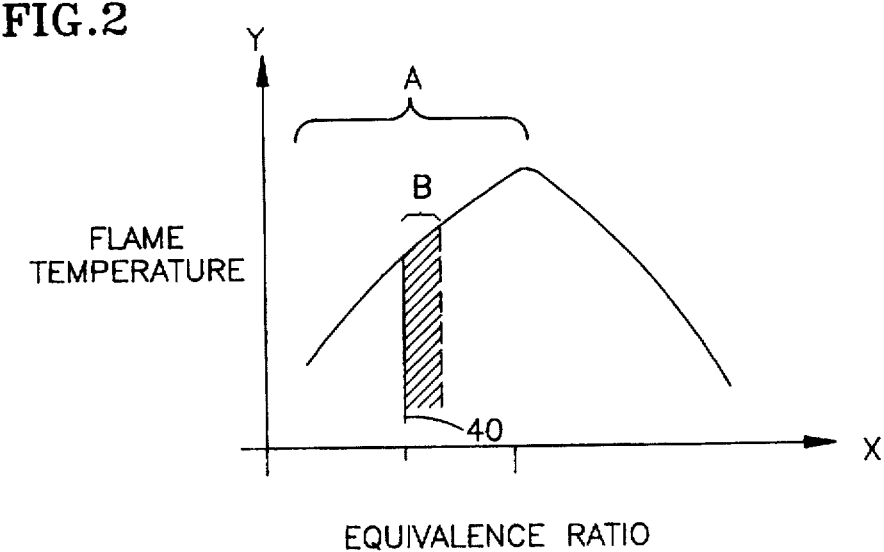
FIG. 2 is a graph of a flame temperature for a given equivalence ratio within the combustor of FIG. 1.

Referring to FIG. 2, a plot of calculated flame temperature for a given equivalence ratio with X axis representing an equivalence ratio and Y axis representing flame temperatures within the combustor is depicted. The equivalence ratio is a ratio of two ratios, with the denominator being equal to the stoichiometric fuel to air ratio for a given fuel and the numerator being equal to an actual fuel to air ratio within the combustor, and can be expressed as:

$$\text{Equivalence Ratio} = \frac{\text{Fuel/Air}}{(\text{Fuel/Air})_{Stoichiometric}}$$

Thus, the plot of FIG. 2 represents a graph of flame temperatures associated with burning fuel as a function of fuel/air ratio. It is desirable to operate the combustor in a fuel-lean zone A to obtain low nitrous oxide emissions. To obtain the lowest nitrous oxide emissions, the combustor must be operated as close as possible to a lean blowout line 40. However, as the power of the gas turbine engine is reduced, thus resulting in a reduced amount of fuel flow to the combustor and subsequently lower temperatures, the combustor may enter an instability zone B, that precedes the lean blowout line 40.

Figure 3:
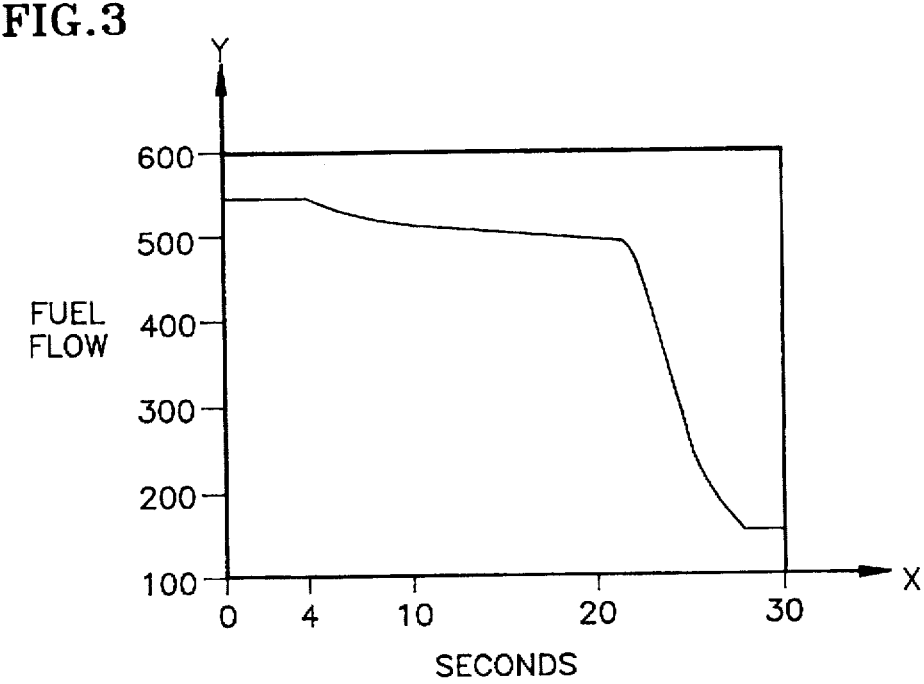
FIG. 3 is a graph of fuel flow through the main fuel nozzle entering the combustor of FIG. 1 at a given time.

During the operation of the gas turbine engine, the pressure probe continuously samples the pressure fluctuations within the combustor to detect changes in pressure signal as the combustor enters the instability zone. The analyzing means analyze the pressure signal in a variety of ways. One criteria for analysis of the pressure signal is the magnitude of pressure fluctuation. FIG. 3 shows a plot of fuel flow to a combustor during a test, with Y axis representing amount of fuel flow and X axis representing time.

Referring to FIG. 3, amount of fuel flowing to the combustor through a main fuel nozzle is varied during a test. The combustor is initially operating within fuel-lean zone A of FIG. 2. The amount of fuel to the combustor is at substantially the same level for the first four seconds (4 sec). The amount of fuel is then continuously reduced starting at four (4) seconds. As the combustor enters the instability zone pressure fluctuations increase until a lean blowout is experienced at approximately nineteen seconds (19 sec).

Figure 4:
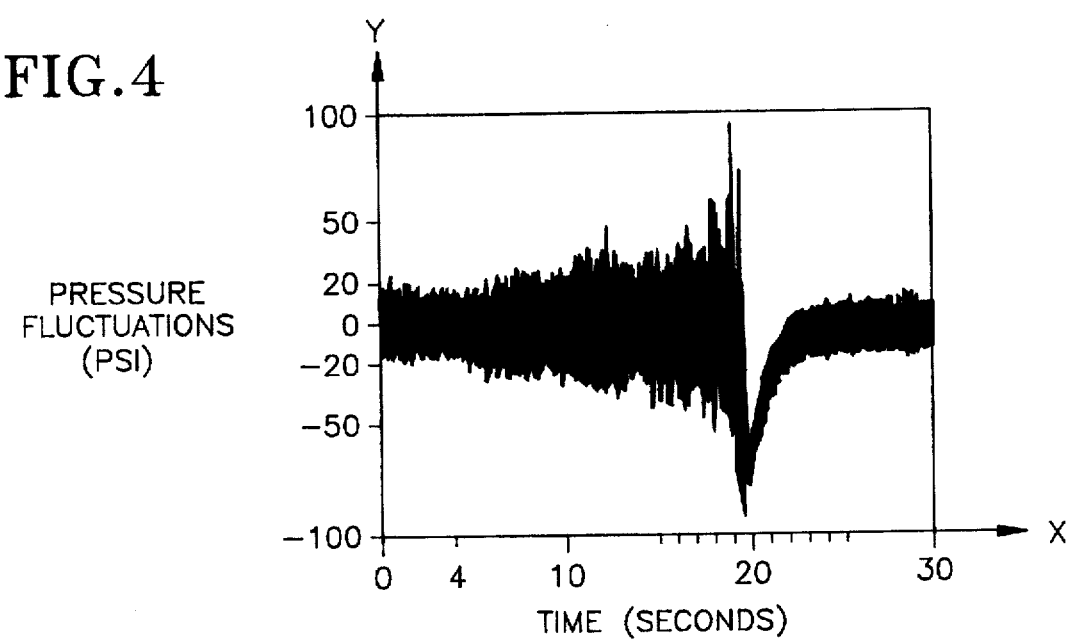
FIG. 4 is a plot of pressure fluctuations as a function of time as the fuel flow through the main nozzle is varied according to FIG. 3.

Referring to FIG. 4, the magnitude of pressure fluctuations varies with the amount of fuel flow to the combustor shown in FIG. 3. The magnitude of the pressure signal remains substantially constant at approximately twenty pounds per square inch (20 psi) from zero seconds to approximately four seconds (0–4 sec) when the fuel flow to the combustor remains at substantially the same level. The magnitude of the pressure signal begins to grow from approximately twenty pounds per square inch (20 psi) or forty pounds per square inch (40 psi) peak to peak at four (4) seconds to approximately fifty pounds per square inch (50 psi) at approximately eighteen (18) seconds, just prior to a lean blowout at approximately nineteen (19) seconds. The threshold for the magnitude signal can be set at approximately thirty pounds per square inch (30 psi). Thus, if the pressure magnitude signal exceeds thirty pounds per square inch (30 psi), the analyzing means 32 sends a signal to the fuel schedule controller 34 to adjust fuel flow to the combustor to locally enrich the combustor.

The present invention identifies an onset of combustor instabilities and/or lean blowout prior to occurrence thereof during operation of the gas turbine engine. A threshold is established to allow sufficient time for corrective action. As the pressure probe 30 continuously sampling the combustor pressure fluctuations, the analyzing means compares the combustor pressure to the previously established threshold. Once the combustion pressure exceeds the threshold, the analyzing means communicates with the fuel schedule controller to adjust the fuel flow to the combustor. Thus, the present invention allows early detection of the upcoming blowout.

Figure 5:
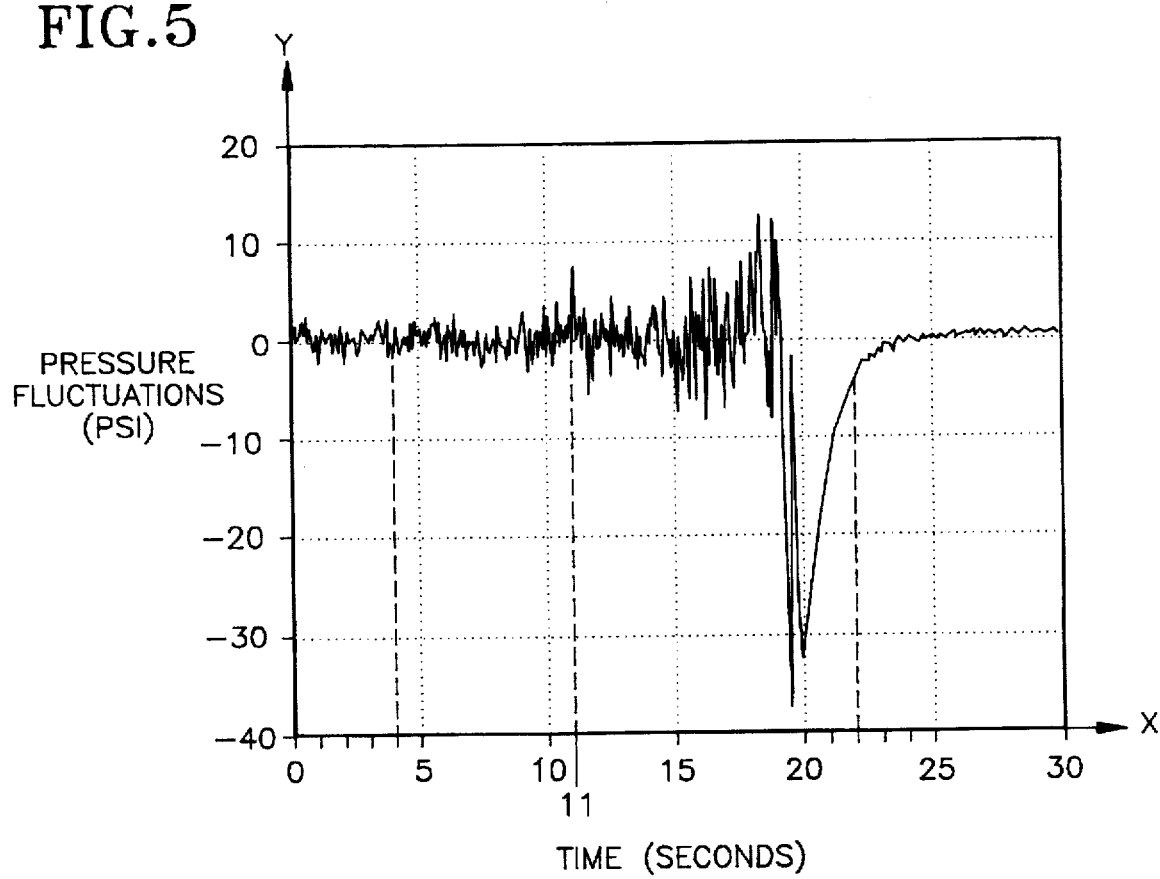
FIG. 5 is a plot of amplitude of pressure fluctuation at frequencies less than three-hundred Hertz (300 Hz) as the fuel flow through the main fuel nozzle is varied according to FIG. 3.

The pressure fluctuations can be analyzed using various criteria. The magnitude of pressure fluctuations less than three hundred Hertz (300 Hz) is another criteria for analyzing the pressure signal. A plot of magnitude of pressure fluctuations (Y axis) as a function of time (X axis) is shown in FIG. 5. The magnitude of pressure fluctuations varies as the amount of fuel flow to the combustor is varied according to schedule of FIG. 3. The magnitude of pressure fluctuations remains substantially constant from zero seconds to approximately four seconds (0–4 sec) at approximately three pounds per square inch (3 psi) when the fuel flow to the combustor is at a substantially the same level. The magnitude of the pressure signal begins to grow at approximately four (4) seconds from approximately three pounds per square inch (3 psi) to approximately ten pounds per square inch (10 psi) at approximately nineteen (19) seconds, just prior to entering the lean blowout region. A threshold of approximately five pounds per square inch (5 psi) is used to determine the instability. As the magnitude of pressure fluctuations below three hundred Hertz (300 Hz) exceeds the threshold of five pounds per square inch (5 psi) occurring at approximately eleven (11) seconds, the analyzing means 32 sends a signal to the fuel schedule controller 34 to adjust fuel flow to the combustor.

Figure 6:
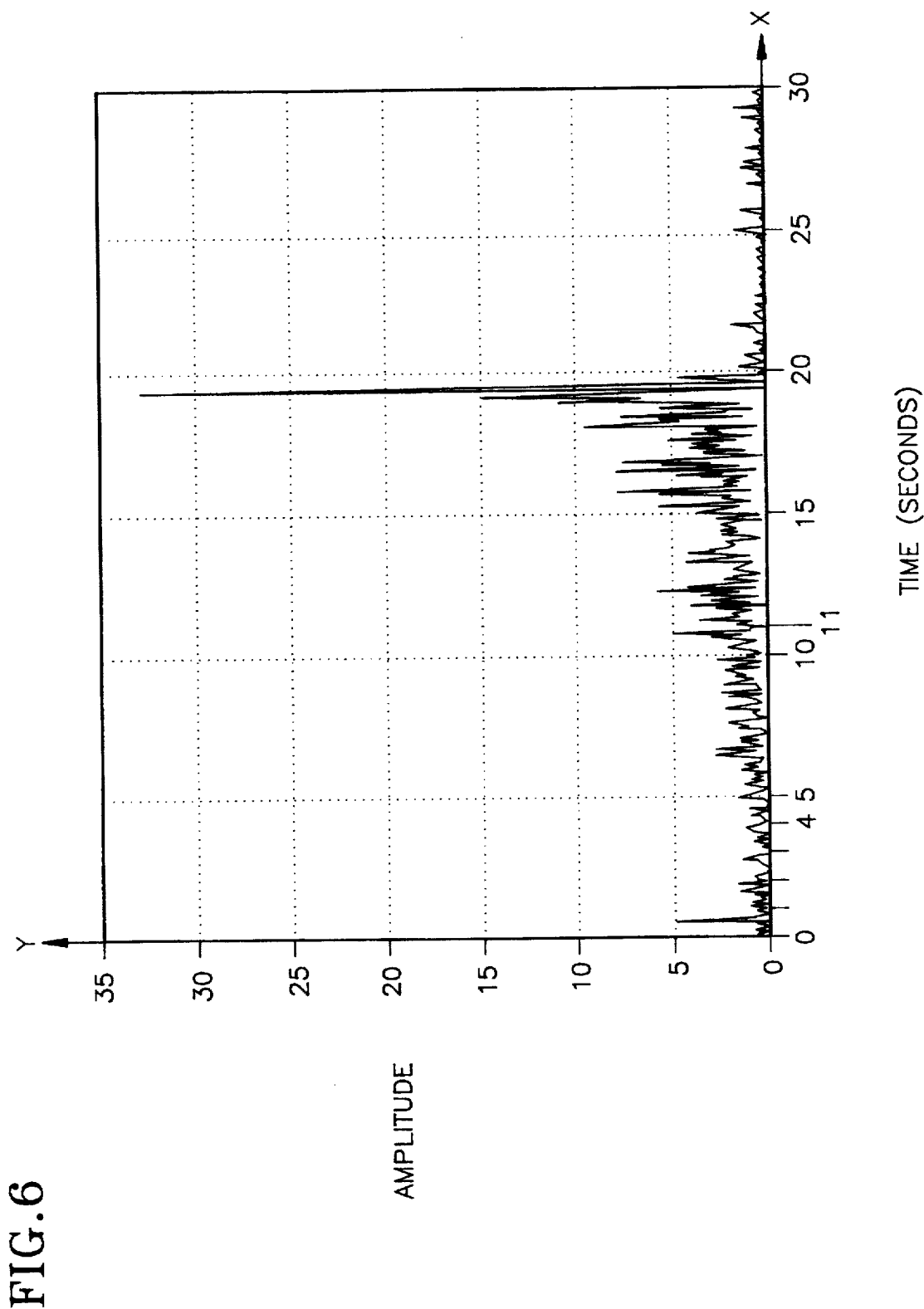
FIG. 6 is a plot of amplitude of energy associated with dominant combustor frequencies less than three-hundred Hertz (300 Hz) varying with fuel flowing to the combustor according to FIG. 3.

A third criteria for analyzing the pressure signal is monitoring energy associated with dominant combustion frequencies below approximately three hundred Hertz (300 Hz). Referring to FIG. 6, a plot of magnitude of frequency (Y axis) versus time (X axis) shows growth in the magnitude of disturbance after four (4) seconds from approximately one pound per square inch (1 psi) to five pounds per square inch (5 psi) at approximately eleven (11) seconds. The disturbance subsides after approximately twenty-one (21) seconds after the combustion process ceases. A threshold of five pounds per square inch (5 psi) absolute (or ten pounds per square inch (10 psi) peak to peak) is established. When the magnitude of disturbance exceeds the threshold, the analyzing means sends a signal to the fuel schedule controller to increase amount of fuel.

Figure 7:
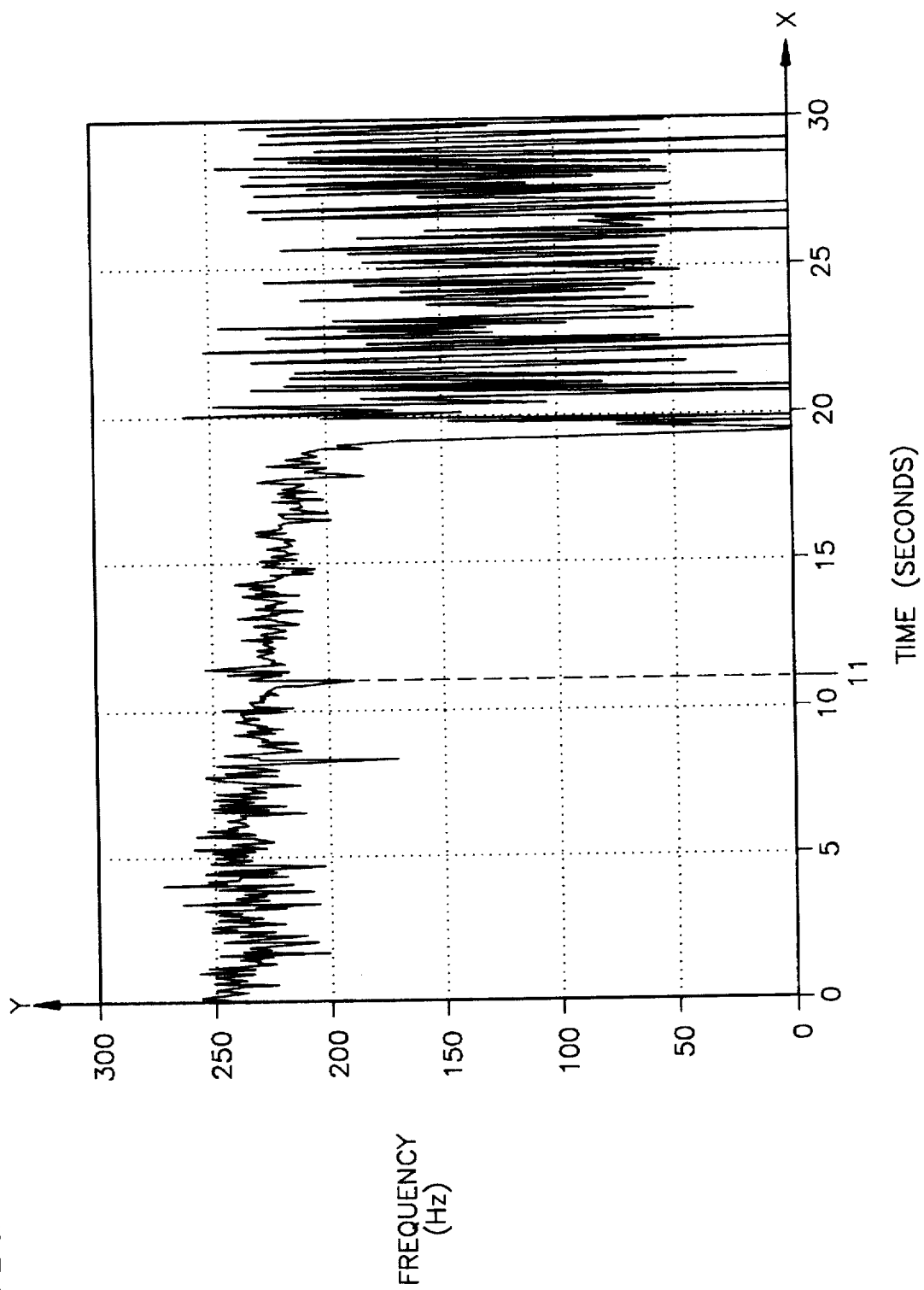
FIG. 7 is a plot of the dominant frequency within the combustor of approximately two hundred to two hundred and fifty Hertz (200–250 Hz) varying with changes in fuel flow according to FIG. 3.

A fourth criteria used to analyze the pressure signal is to monitor the magnitude of the dominant frequency within the combustor (Y axis) versus time (X axis), as shown in FIG. 7. During the initial four (4) seconds, the dominant frequency is approximately two hundred thirty Hertz (230 Hz).

As the amount of fuel into the combustor is decreased, the dominant frequency decreases. The threshold value for this parameter is approximately two hundred Hertz (200 Hz). Thus, if the analyzing means 32 senses that the dominant frequency drops below the two hundred Hertz (200 Hz) level, the signal is sent to the fuel schedule controller 34 to adjust fuel flow to the combustor.

Figure 8:
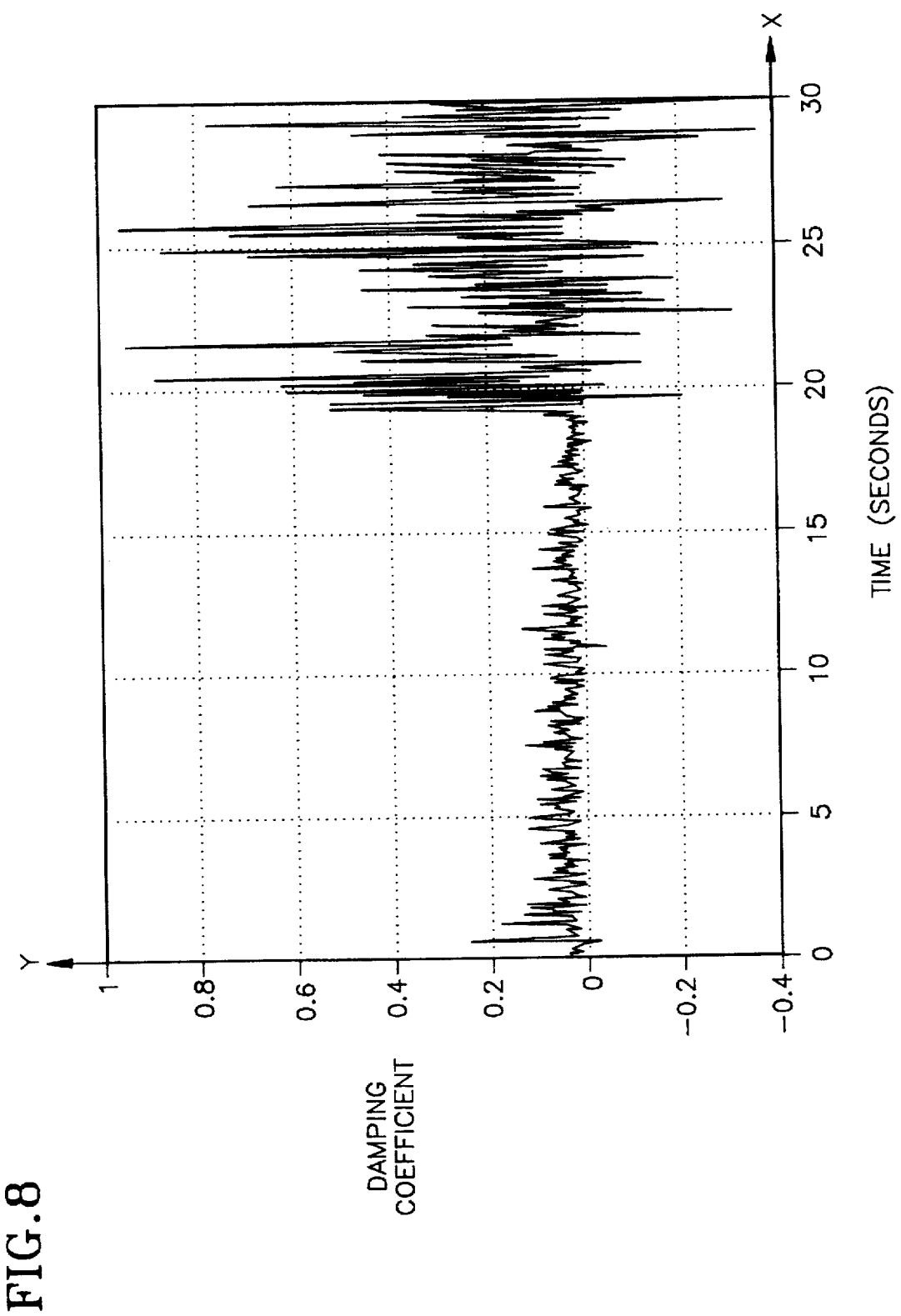
FIG. 8 is a plot of amplitude of a damping coefficient of approximately two hundred to three hundred and fifty (200–350 Hz) varying with changes in fuel flow according to FIG. 3.

The fifth criteria to analyze pressure signals is to monitor a damping coefficient. Referring to FIG. 8, a magnitude of damping coefficient (Y axis) versus time (X axis) plot reveals that the magnitude of the damping coefficient decreases after approximately four (4) seconds as the combustor approaches instability at approximately nineteen (19) seconds. Thus, if the analyzing means 32 senses that the damping coefficient becomes less than zero (0), it sends a signal to the fuel schedule controller 34 to adjust fuel flow to the combustor to avoid lean blowout.

Although any one of the five methods to analyze the pressure signal establishes a precursor condition, a combination of methods can be used to insure a more accurate system. If the analyzing means 32 senses that at least two of the parameters have crossed the threshold limit, then it will communicate with the fuel schedule controller 34. The analyzing means 32 can be set up to be triggered by as few as one parameter or as many as all five.

As soon as the fuel schedule controller 34 receives a signal from the analyzing means 32 to adjust fuel flow to the combustor, fuel flow can be adjusted by either increasing fuel flow through the pilot fuel nozzles or staging main fuel nozzles and/or pilot fuel nozzles. If the fuel output through the pilot fuel nozzle is increased, the combustion process increases at those discrete locations around the pilot fuel nozzles with greater amounts of fuel and higher flame temperatures. Although the level of nitrous oxide emission increases with increased level of fuel, the combustor avoids entering the lean blowout zone. The lean blowout also can be avoided by staging either the main fuel nozzles or the pilot fuel nozzles. The fuel flow to some of the nozzles is cut off and redistributed to a lesser number of nozzles. Thus, the fuel flow to some member of fuel nozzles is increased, resulting in enriched burning in those discrete locations, thereby sustaining combustion within the combustor.

Once the combustor pressure indicators move within the threshold limits, the amount of fuel can be reduced so that the leanest possible combustion process is maintained within the combustor.

One primary advantage of the present invention is that low levels of nitrous oxides are maintained without the combustor blowing out or entering the instability zone for a prolonged period of time. The lowest levels of nitrous oxides are achieved when the combustor operates in the fuel-lean environment, zone A, in FIG. 2, as close to the lean blowout line 40 as possible. However, prior to the combustor crossing the lean blowout line, the combustor operates within instability zone B. Since it is highly undesirable to either cross the lean blowout line or operate within the instability zone for a prolonged period of time, the present invention establishes precursor conditions to either one of the events and allows preventive measures to be taken to avert a low lean blowout or an instability, while achieving low $NO_x$. The present invention further allows the combustor to operate at the lowest levels of $NO_x$ emissions after the combustor operation stabilizes.

The analyzing means of the present invention can be any type of computing device with a number of software packages. One commercially available software product that is suitable for the present application is MATLAB®, a registered trademark of the Math Works, Inc. of Natick, Mass.

The pressure probe 30 shown in FIG. 1 can be disposed at a variety of locations. The pressure probe 30 can be disposed either within the combustor or in the vicinity of the combustor. The threshold for the pressure signal parameters disclosed above, with the exception of the frequency parameter, vary depending on the location of the pressure probe 30. Also, the threshold values can be adjusted to allow sufficient amount of time for corrective action to be taken.

Although the invention has been shown and described with respect to preferred embodiments thereof, it should be understood by those skilled in the art that various changes and omissions in the form and detail thereof may be made therein without departing from the spirit and scope of the invention.

I claim:

1. A method of minimizing nitrous oxide emissions in a gas turbine combustor having main fuel nozzles and a plurality of pilot fuel nozzles by operating a combustor close to a lean blowout condition, said method characterized by:
   firing said pilot fuel nozzles with an unpulsed fuel flow;
   monitoring normal combustion induced pressure fluctuations within said combustor; and
   increasing the amount of fuel flow with respect to air flow to at least a portion of of said combustor when the amplitude of said pressure fluctuations within said combustor exceed a predetermined threshold.

2. The method according to claim 1, further characterized by a step of comparing magnitude of pressure fluctuations less than three hundred Hertz (300 Hz) with said threshold.

3. The method according to claim 1, further characterized by a step of comparing energy associated with dominant combustion frequencies below approximately three hundred Hertz (300 Hz) with said threshold.

4. The method according to claim 1, further characterized by a step of comparing magnitude of a dominant frequency within said combustor with said threshold.

5. The method according to claim 1, further characterized by a step of comparing magnitude of a damping coefficient with said threshold.

6. The method according to claim 1, further characterized by a step of sending a signal to fuel schedule control means to increase the amount of fuel supplied to said combustor.

7. The method according to claim 6, further characterized by a subsequent step of increasing the amount of fuel to pilot fuel nozzles.

8. The method according to claim 1, further characterized by a subsequent step of staging a plurality of pilot fuel nozzles so that fuel flow to some of said plurality of pilot fuel nozzles is decreased and fuel flow to other said pilot nozzles is increased to result in a zone of fuel enriched fuel-lean combustion within said combustor.

9. The method according to claim 1, further characterized by a subsequent step of staging a plurality of main fuel nozzles so that fuel flow to some of said plurality of main fuel nozzles is decreased and fuel flow to other said main nozzles is increased to result in a zone of enriched fuel-lean combustion within said combustor.

10. A method of minimizing nitrous oxide emissions by operating a gas turbine combustor close to a lean blowout condition, said method characterized by:
   monitoring pressure fluctuations within said combustor continuously throughout a combustion process within said combustor;
   analyzing said pressure fluctuations by at least one method of analysis;
   sending a first signal to fuel schedule controller means once the magnitude of said pressure fluctuations exceed a preestablished threshold;

adjusting fuel flow into said combustor to avoid combustion instability and lean blowout;

continuing to monitor said pressure fluctuations;

sending said a second signal to said fuel schedule controller means once the magnitude of said pressure fluctuations fall below said preestablished threshold; and readjusting fuel flow to operate said combustor in a fuel-lean environment.

11. A method of minimizing nitrous oxide emissions in a gas turbine combustor, said method characterized by:

establishing a threshold for at least one stability parameter;

sensing pressure fluctuations within said combustor continuously throughout a combustion process within said combustor through a pressure probe disposed within said combustor;

sending said sensed pressure fluctuations to a signal analyzing means;

comparing said sensed pressure fluctuations to at least one threshold;

sending a first signal to fuel schedule controller means once the magnitude of said sensed pressure fluctuations exceed at least one said preestablished threshold;

adjusting fuel flow into said combustor to avoid combustion instability and lean blowout;

continuing to monitor said pressure fluctuations;

sending said a second signal to said fuel schedule controller means once the magnitude of said pressure fluctuations fall below said preestablished threshold; and readjusting fuel flow to operate said combustor in a fuel-lean environment.

\* \* \* \* \*